United States Patent [19]

Sisson et al.

[11] Patent Number: 4,856,604
[45] Date of Patent: Aug. 15, 1989

[54] APPARATUS AND METHOD OF DETERMINING THE AUTHENTICITY OF WEIGHT OBTAINED FROM A VIBRATING TRAY SCALE

[75] Inventors: Robert W. Sisson, Norwalk, Conn.; Richard A. Connell, South Salem, N.Y.

[73] Assignee: Pitney Bowes Inc., Stamford, Conn.

[21] Appl. No.: 176,585

[22] Filed: Apr. 1, 1988

[51] Int. Cl.$^4$ .................... G01G 3/14; G01G 19/52
[52] U.S. Cl. ................... 177/210 FP; 177/1; 177/50
[58] Field of Search ............ 177/1, 50, 210 FP

[56] References Cited

U.S. PATENT DOCUMENTS 4,158,395 6/1979 Brown .................... 177/210 FP
4,370,888 2/1983 Popper ................. 177/210 FP X

*Primary Examiner*—George H. Miller, Jr.
*Attorney, Agent, or Firm*—Peter Vrahotes; Melvin J. Scolnick; David E. Pitchenik

[57] ABSTRACT

Apparatus and method of determining the authenticity of a signal indicative of the mass of an article being weighted. The article is placed upon the platform, and the platform is caused to oscillate and the period of harmonic motion is measured. One of or both the frequency of oscillation and amplitude of the transducer signal is monitored for purposes of determining authentication.

18 Claims, 7 Drawing Sheets

APPARATUS AND METHOD OF DETERMINING THE AUTHENTICITY OF WEIGHT OBTAINED FROM A VIBRATING TRAY SCALE

RELATED CASE

U.S. patent application Ser. No. 073,790 filed July 13, 1987 for APPARATUS AND METHOD OF DETERMINING THE MASS OF AN ARTICLE BY MEASURING THE SHIFT IN THE PERIOD OF HARMONIC MOTION.

Background of the Invention

As technology progresses, processes tend to proceed at a faster pace. Most processes require the coordination of a number of components, and the process can only proceed as fast as the slowest component allows unless multiple like components are used. There are certain processes in which the weight of an article is required, but there had been no scale available that provides accurate, fast weighing. By accurate is meant the ability to weigh in accordance with the class 3 definition of weights and measurements contained in the National Bureau of Standards Handbook 44. By fast is meant the ability to weigh a stream of conveyed articles within less than one second per article. A process where there is a need for fast weighing is in the processing of flat mail. High speed systems have been developed whereby the appropriate number of inserts, which number may vary from envelope to envelope, are placed within an envelope. The envelope is sealed and postage is printed on the envelope. Before the postage can be printed, however, it is necessary that the weight of the mail piece be deteremined.

Recently, a vibrating tray scale has been conceived and developed whereby accurate, rapid weighing can be achieved. The vibrating tray scale is described in copending patent application having serial number 073,790, filed July 13, 1987, entitled APPARATUS AND METHOD OF DETIRMINING THE MASS OF AN ARTICLE BY MEASURING THE SHIFT IN THE PERIOD OF HARMONIC MOTION, and assigned to the assignee of the instant patent application. The primary purpose of the vibrating tray scale in said copending application is to weigh mail pieces. More specifically, the mail pieces have postage applied thereto in accordance with the weight determination of such mail pieces. Because the postage applied represents monetary value, measures must be taken to assure that the weight is not only accurate, but that no wrongful act or system fault has taken place that would result in a weight determination that is different than the actual weight of the article being weighed.

SUMMARY OF THE IVNENTION

A unique method and apparatus has been conceived for determining authenticity of a signal received from a scale that uses harmonic vibration for the purposes of determining the weight of an article. For the purpose of such determination, a flexibly mounted tray is caused to oscillate by an initial excitation action. The frequency of the oscillation is dependent upon the total mass of the platform, and anything connected thereto, and upon the platform spring constant. The platform with its associated components is caused to oscillate by applying an exciting pulse after which the periods of oscillation with different calibrated weights are measured. An object is then placed upon the scale and again the platform is excited. The period of oscillation of the platform with the article of unknown weight thereon is determined. The period of oscillation obtained with the article on the platform is compared with the calibration tests and the mass of the article thereafter can be determined using derived equations.

To ascertain authenticity of the output signal from the scale, i.e. to assure there is no tampering or system fault, both the amplitudes of such output and the uniformity or consistency of oscillation are monitored. In a valid signal, the amplitude will decrease gradually at a rate characteristic of the scale structure, while the period will converge rapidly to a steady value. If such uniformity or consistency is absent, this is an indication the reading is faulty and the weight indication will be rejected.

DETAILED DESCRIPTION OF THE PREFERRED EMBODIMENT

Figure 1:
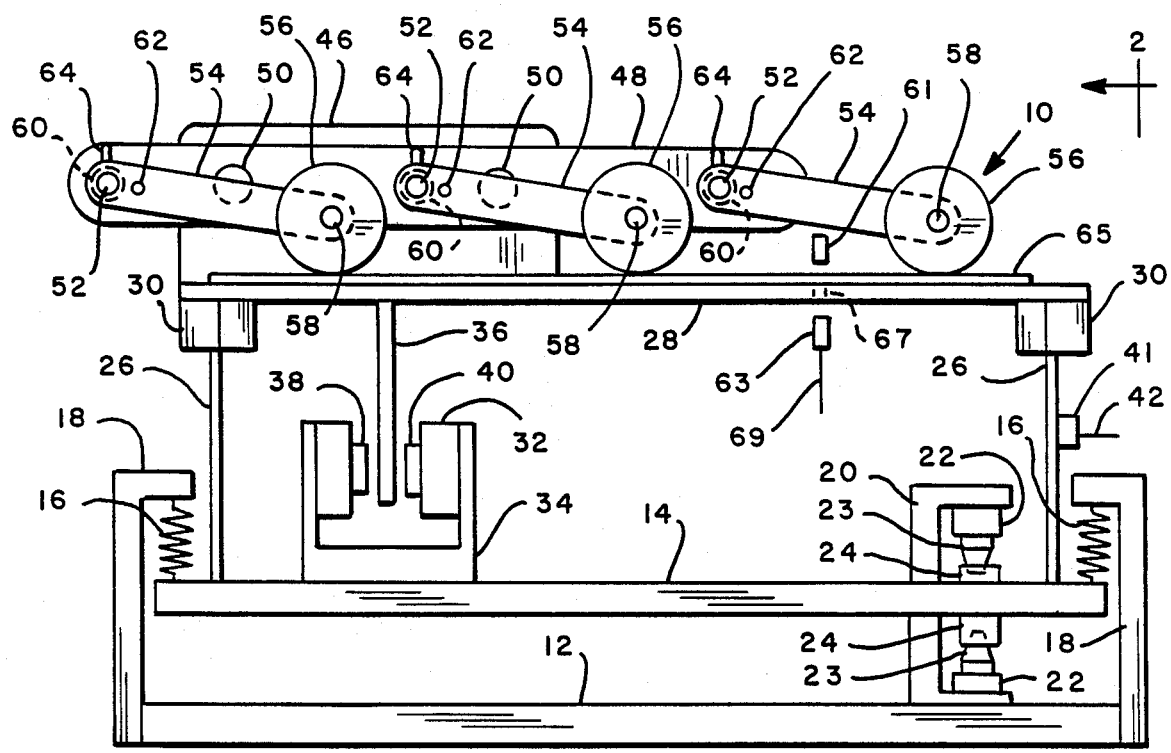
FIG. 1 is a longitudinal side view of a weighing device in which the features of the instant invention may be applied.
Figure 2:
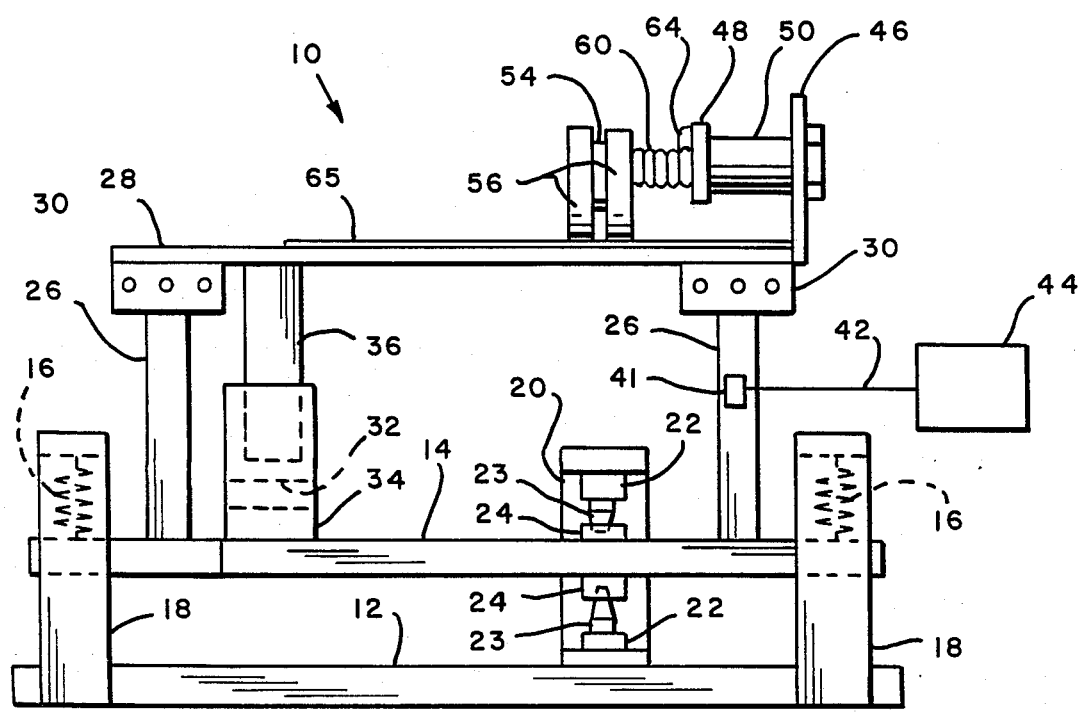
FIG. 2 is an end view of the weighing device taken along the lines 2—2 of FIG. 1.

Referring to FIGS. 1 and 2, a weighing device in which the instant invention can be utilized is shown generally at 10. Although the weighing device 10 may be used in a large number of applications wherein fast and accurate weight determination is required, it will be described as used in a system that processes mail pieces such as envelopes with inserts, post cards and the like to which postage is to be applied. The weighing device 10 includes a frame 12 that may be placed upon a machine housing, table or other type of support. A base 14 is supported above the frame 12 by isolation coil springs 16 each of which is secured at one end to an inverted, generally L-shaped vertically extending arms 18 of the frame 12 and to the base 14 at tteir other ends. The isolation springs 16 serve the function of isolating the weighing device 10 from vibrations transmitted by the support upon which the frame 12 is placed. For example, if the weighing device 10 is placed upon a mailing machine or inserter, such support member, when operating, has a tendency to transmit vibrations. The presence of the isolating springs 16 is to reduce the transmission of such vibrations.

A generally C-shaped arm 20 is attached to the frame 12. This C-shaped arm 20 supports a pair of clamping solenoids 22 whose pistons 23 have a conical shape at their ends and are engageable with depressions of generally cup shaped pads 24 that are secured to opposite sides of the base 14. Upon enablement of the solenoids 22, the pistons 23 will be received within the depressions of the pads 24 to securely hold the base 14 for reasons that will be described hereinafter.

Secured to the base 14 are a plurality of flexible supports 26, upon which a tray or platform 28 is secured by connectors 30. These flexible supports 26 can be made of thin strips of stainless steel or aluminum. Although four flexible supports are shown in the preferred embodiment, it will be appreciated any number may be used without departing from the scope of the invention.

An electromagnet 32 is supported by a bracket 34, that is mounted on the base 14. An armature 36 depends from the tray 28 and is received between with the poles 38,40 of the electromagnet 32. A transducer 41, as for example, a piezoelectric device, is secured to one of the flexible supports 26 and has a lead 42 extending therefrom to an electrical system 44 that will be described with reference to FIG. 3.

Secured to the tray 28 is a bracket 46 to which a plate 48 is attached by spacer-bolt combinations 50. A plurality of pins 52 are fixed to the plate 48 and each pin 52 rotatably supports a pivot arm 54. Paired idler rollers 56 are rotatably supported upon each pivot are 54 by a shaft 58. Positioned on each pin 52 between the plate 48 and each pivot arm 54 is an expansion spring 60 that has tangs 62,64 at its opposite ends that are received within the plate 48 and pivot arms 54, respectively. These springs 60 are provided to urge the idler rollers 56 toward the tray 28 to hold an envelope 65 securely against the tray.

Located above the tray 28 is a light 61 and located below the tray and in registration with the light 61 is a photosensor 63, there being an opening 67 in the tray for allowing light to pass therethrough. The photosensor 63 is connected to the electrical system 44 by a lead 69. A mail piece 65 is shown on the tray 28 at a location with its leading edge past the photosensor 63. The light 61 and photosensor 63 are supported by the frame 12 by support means (not shown).

Figure 3:
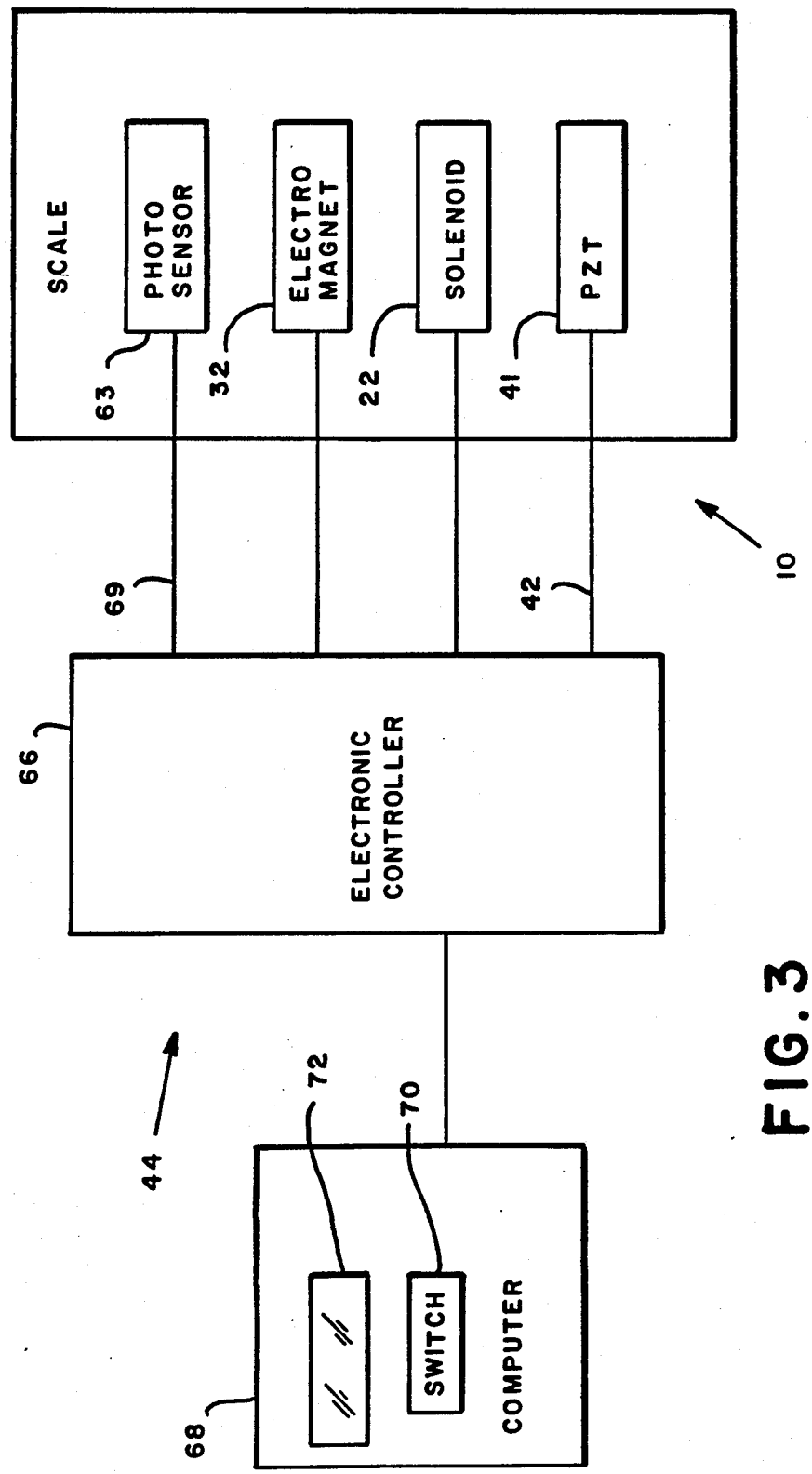
FIG. 3 is a block diagram of the electrical circuit used by the weighing device shown in FIGS. 1 and 2.
Figure 4:
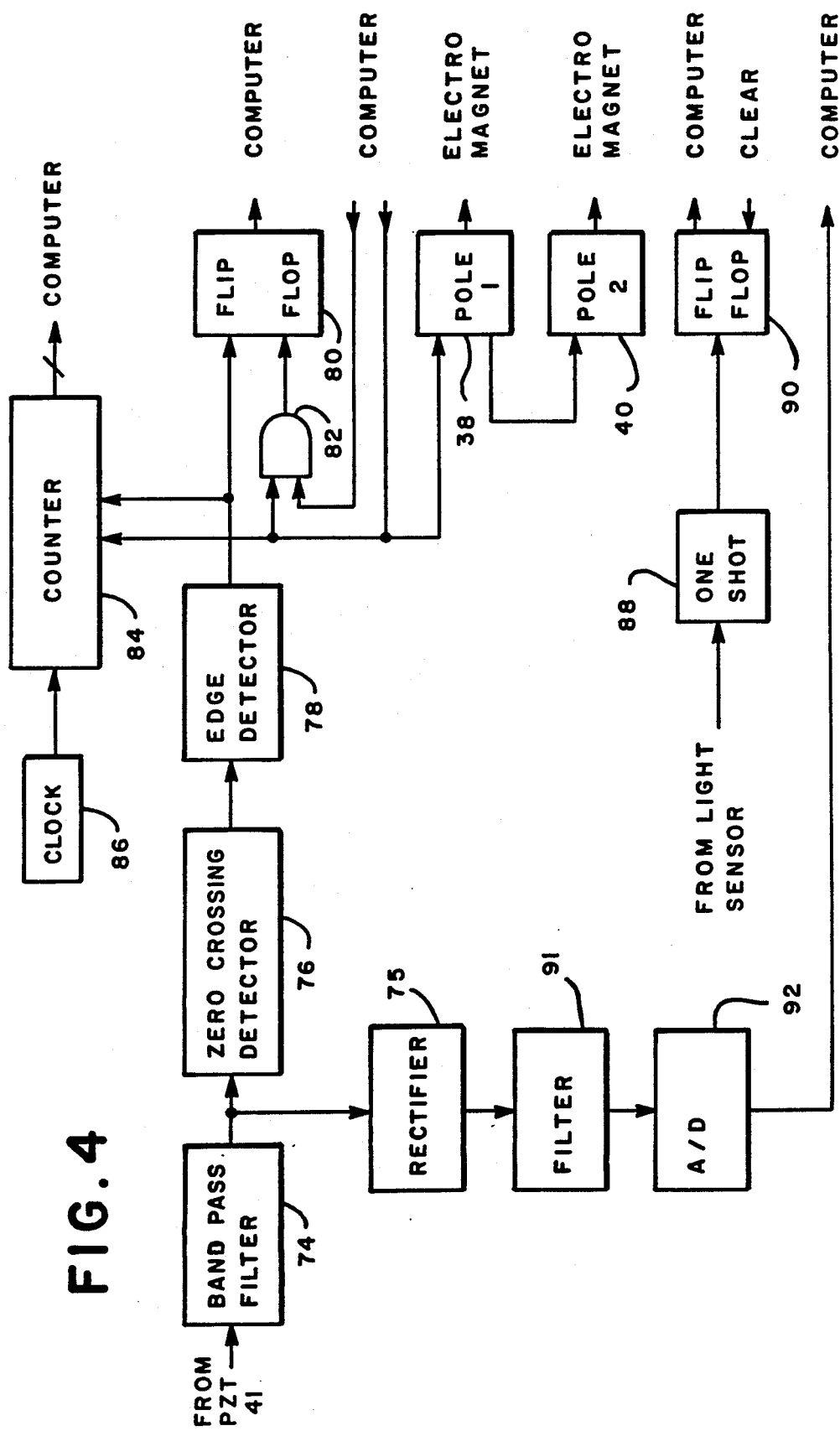
FIG. 4 is a block diagram of the components of the electronic controller shown in FIG. 3.

Referring now to FIGS. 3, the circuitry of the electrical system 44 is shown along with components with which it communicates. An electronic controller 66, the details of which are shown in FIG. 4, is in electrical connection with the photosensor 63, the electromagnet 32, the the clamping solenoids 22, and the piezoelectric transducer 41. The electronic controller 66 is also in electrical connection with a computer 68 that has a switch 70, which enables the entire electrical system shown in FIG. 3, and a display 72, which displays the determined weight of a mail piece 65 located on the tray 28. The components the electronic controller 66 are shown in FIG. 4 and include a band pass filter 74 that receives the output from the piezoelectric transducer 41 and is connected to a full wave rectifier 75 and a zero crossing detector 76. The band pass filter 74 eliminates high frequency electrical noise and low frequency mechanical noise from the signal received from the piezoelectric transducer 41. The full wave rectifier inverts the negative portions of the signal for monitoring the amplitude of the signal as will be described with reference to FIGS. 9a–9b. The zero crossing detector 76 converts the signal received from the band pass filter to a square wave for monitoring the frequency of the signal as described with reference to FIG. 6a–6b to FIG. 8a–8b. The zero crossing detector 76 is in electrical connection with an edge detector 78 that detects the edge of each square wave produced by the zero crossing detector. The edge detector 78 is in electrical connection with a flip-flop 80 that receives an input from an AND gate 82. The AND gate 82 is in connection with the computer 68 and a counter 84 that has inputs from a clock 86 and the edge detector 78. The two poles 38,40 of the electromagnet 32 are in electrical connection with the counter 84. A one shot vibrator 88 is in connection with a flip-flop 90 and with the photosensor 63. The flip-flop 90 is in communication with the computer 68. Thus, as a mail piece is sensed by the photosensor 63, the one shot vibrator 88 will send a pulse to the flip-flop 90 which in turn will communicate to the computer 68 the presence of a mail piece 65. Alternatively, after a mail piece 65 is taken away from tray 28 and sensed by the photosensor 63, the one shot vibrator 88 will again pulse the flip-flop 90 to signal the computer 68.

Connected to the rectifier 75 is an RC smoothing filter 91 which in turn is connected to an analogue to digital converter 92. The A/D converter is connected to the computer 68. When the scale 10 is to be operated, the on/off switch 70 of the computer 68 is placed into the "on" position. A mail piece 65 is placed under the rollers 56 manually or by any convenient device. The mail piece 65 must be placed on the tray 28 so that it is located under the rollers 56 which hold the mail piece firmly against the tray and between the light 61 and photosensor 63. When the mail piece 65 is sensed by the photosensor 63, a signal is sent to the electronic controller 66 thereby actuating the solenoids 22 so that the pistons 23 become disengaged from the pads 24. At this time, both the tray 28 and the base 14 are in a state of free movement, the tray 28 being in such state because of the flexible supports 26 and the base because of the presence of the springs 16. Consequently, the base 14 and everything attached thereto is isolated from its surroundings. At this time, the electromagnet 32 is actuated charges being sent alternatively to the poles 38,40. This double pulse will cause attraction of the armature 36 towards one of the poles 38,40 and then towards the other. The pulse will initiate free oscillation of the tray 28 because of the flexibility of the flexible supports 26. As the tray 28 oscillates, a sinusoidal signal is transmitted from the transducer 41 in the form shown in FIG. 5b. This sinusoidal signal is transmitted from the piezoelectric device 41 to the electronic controller 66 and is received by band pass filter 74 and then sent to the zero crossing detector 76. The zero crossing detector acts as a schmitt trigger and will convert the sinusoidal curve to a square wave pulse as shown in FIG. 5c. The edge detector 78 will detect the edges of the wave, which represent the zero crossings of the sinusoidal curve of FIG. 5b and send these edge detection pulses to the flip-flop 80. The flip-flop 80 will send these signals on to the computer 68. The computer 68 will then read the counter 84 and determine the frequency of the zero crossings. This determined frequency will then be used to compute the mass of the mail piece 65 located upon the tray 28.

Figure 5A:
FIGS. 5a–5c are grapths that show a single pulse applied to the weighing device, a valid plot of the oscillation of the tray of the weighing device shown in FIG. 1 as a result of the single pulse, and a square wave form of the oscillation, respectively.
Figure 5B:
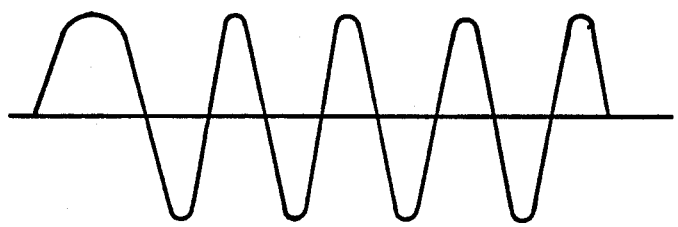
Figure 5C:
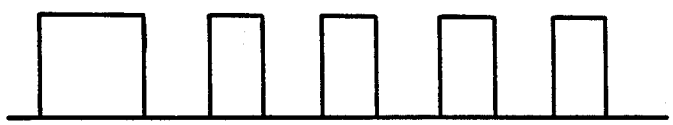

With the tray 28 having no mail piece 65 thereon, the electromagnet 32 is pulse energized for approximately 12 milliseconds by the poles, as is shown in the upper graph of FIG. 5a, thereby causing the armature 36 to be attracted to one pole 38,40 and then the other during the 12 milliseconds the electromagnet is pulse energized. The flexible supports 26 and the tray 28 which is attached to them are thus excited into oscillation. As the flexible support 26 with the transducer 41 thereon is flexed and continues to oscillate, the transducer will output an alternating voltage that will have a frequency depending upon the mass of the tray 28 and anything secured thereto. It will be noted that the tray 28 has the idle rollers 56 and the mechanisms for supporting these idler rollers attached thereto which form and part of the mass that influences the frequency. As the tray 28 oscillates, its oscillation is measured by the transducer 41 as an output voltage whose plot is shown in FIG. 5b. After the electromagnet 32 is enabled, the sinusoidal curve is not symmetric and at least one cycle of oscillation is required before a uniform curve is obtained. Consequently, a delay is required before measurements can be taken, this delay being programmed into the controller 66 and being approximately 0.024 secs. After the delay, the frequency, or period, of zero crossings is determined by the electronic controller 66. After an initial surge, the frequency of the zero crossing is basically uniform and the damping of the signal is imperceptible. After the frequency of zero crossings is determined, an article such as an envelope or mail piece 65 is placed upon the tray 28. Automatic means for positioning the mail piece will not be described since it is not a part of the instant invention. Such conveying means are described in said copending patent application having Ser. No. 073,790 to which reference can be made. It will be appreciated that the mail piece 65 will be held securely upon the tray 28 because the rollers 56 will still be in engagement therewith as a result of the biasing action of the springs 60 so the mail piece and platform will move as a unit.

With the mail piece 65 on the platform in its predetermined position, i.e., under the rollers 56 and between the light 61 and photosensor 63, the electromagnet 32 will be enabled causing the armature 90 and the tray 28 to oscillate. This oscillation will be reflected by the transducer 41 and the period of oscillation will be measured as described previously. From this, one will be able to determine the mass of the mail piece 65 located upon the platform 27 in accordance with the formula:

$$M_E = C_1(T^2 - T_0^2) + C_2(T^2 - T_0^2)^2, \quad (1)$$

where $M_E$ is the mail piece 65 mass, $T_0$ is the period of oscillation with no mail piece and T is the period with the mail piece present upon the tray 28. $T_0$, $C_1$ and $C_2$ are constants which depend on the mass of the base M and the mass of the tray 28 as well as on the spring constants of the isolation springs 16 and the flexible supports 26. These constants are determined empirically in a calibration procedure in which the periods are determined for at least two different masses as well as for the empty scale. In the limit that the base 14 is substantially heavier than the mass of the platform 27 plus the mass of the mail pieces, the constant $C_1$ is given by the formula:

$$ti\ C_1 \approx K/(4\pi^2), \quad (2)$$

where K is the spring constant of the flexible supports 26. In the same limit $T_O$ is given by the formula:

$$T_0 2 \approx (4\pi^2) M_p/K, \quad (3)$$

where $M_p$ is the tray 28 mass.

When a spring is attached to two isolated masses m and M, its period of oscillation is $$T^2 = 4\pi^2 \mu/K. \quad (4)$$

where $\mu$ is the reduced mass:

$$\mu = mM/(m+M). \quad (5)$$

In the limit where M is much larger than m, the reduced mass $\mu$ is less than and close to the value of m. Equation (4) can be solved for m in terms of T. In the scale 10, the base 14 mass M is much larger than m the combined tray 28 plus mail piece 65 mass; however, due to the accrruracy required, the difference between $\mu$ and m must be taken into account. This is done by combining equations 4 and 5.

There are other corrections to the period due to the fact that the system is damped slightly and due to the fact that the base 14 is attached to the frame 12 through the isolation springs 16. The system is further complicated by the fact that the attempt to determine the period is done through measurements of the first few periods of oscillation. During this time, some initial transients due to the initial pulse are occurring. As a result, the best that can be said is that it can be expected that the mass is a nonlinear function of the period squared with the leading nonlinearity given by equations 4 and 5. It has been observed empirically that the nonlinearity can be approximated by a parabola represented by equation 1.

The mass is determined by the circuitry shown in FIGS. 3 and 4. The computer 68, which may be any of a number of standard commercially available computers such as a Compaq Model 286 PC, is in communication with the electronic controller 66 or the computer function may be served by a microprocessor with appropriate software. The transducer 41 will output a voltage that is filtered by the band pass filter 74 and applied to the zero crossing detector 76 which is basically an operational amplifier that saturates at five volts to output a square wave as shown in FIG. 5c. The duration of the square wave yields the time between zero crossings which is determined by the edge detector 78. The edge detector 78 outputs a pulse when each edge of the square waves is detected, which of course, represents a zero crossing. These outputs are sent to the counter 84 that counts the clock cycles between zero crossings, and to the AND gate 82. The flip-flop 80 will then send zero crossing ready signal to the computer 68 which will then read the count. Based upon this count, the computer 68 upon reading the count will then compute the mass of the mail piece 65 through an algorithm that allows computation by application of the above formulas. This computed mass is then shown on the display 72.

After the output from the transducer 41 has been obtained, the solenoids 22 are enabled to securely hold the base 14 in a predetermined position and the mail piece 65 is removed from the tray 28.

Using the method described above, one is able to obtain quite accurate determinations of the mass of articles placed upon the tray 28. The accuracy is better than 1/32 of an ounce for mail pieces 65 up to 32 ounces. Not only does one obtain an extremely accurate measurement of the mass, but it can be done in a rapid fashion.

Figure 6A:
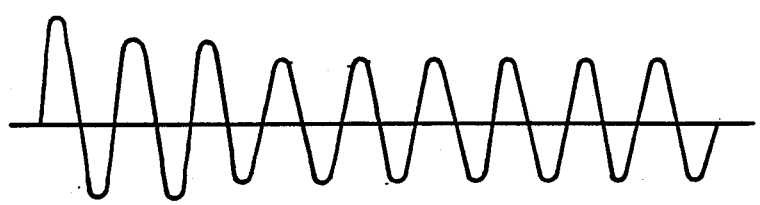
FIGS. 6a–6b show graphs similar to FIGS. 5a and 5c, but showing an irregular plot of the tray oscillation as a result of a system fault.
Figure 6B:

Referring now to FIG. 6a-6b through 9a-9b, plots are shown whereby a determination can be made if there is a machine fault or tampering with the scale. It will be appreciated that these plots result from the weighing scale shown and described and other scales could produce different plots. Tampering with the scale may be occasioned by contacting the tray during periods of oscillation, thereby influencing the output from the transducer 41. Such tampering may take the form of a finger pushing either up or down on the tray, or an object such as a pencil preventing the tray from having its normal oscillation. FIGS. 6a-6b show a plot of the signal received and generated by the electronic controller 66 when there is a malfunction in the scale. This malfunction may be caused by defective parts, a surge in the incoming voltage, a loose article such as a coin moving within the mail piece 25 or the mail piece 65 not being held securely to the tray. It will be noted tat with the machine malfunction, the amplitude of the curve is considerably less than a valid curve, and the variation in frequency and amplitude is far greater than a normal signal indicated by FIGS. 5b and 5c.

Figure 7A:
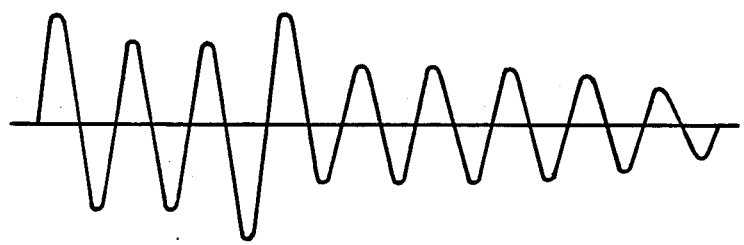
FIGS. 7a and 7b, 8a–8b and 9a–9b show graphs similar to FIG. 5b and 5c but showing an irregular plot resulting from tampering with the oscillation of tray, and FIG. 10. is a flow chart describing the steps involved in determining the mass and the authenticity cf the mass of an article.
Figure 7B:
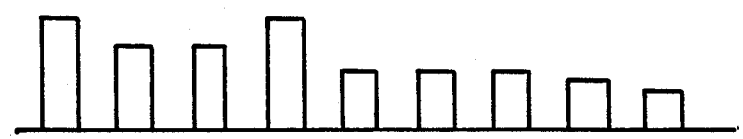
Figure 8A:
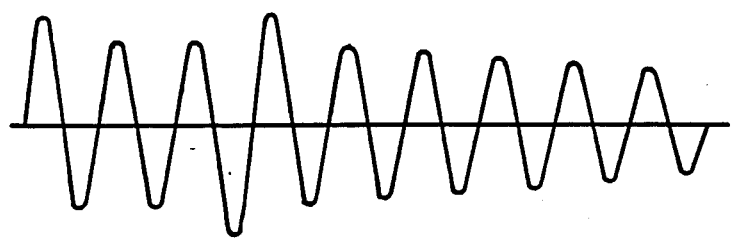
Figure 8B:

FIGS. 7a-7b shows a signal received when a finger is applying slight pressure downwardly upon a tray. It will be noted that the amplitude of the curve is damped much faster than with the normal authentic signal as shown in FIGS. 5b and 5c. FIG. 8a-8b indicates a signal that is received when a finger is applying slight pressure upwardly upon the tray 28. This signal is somewhat similar to that of the signal obtained when one is pushing down on the tray, but the amplitude is somewhat higher, and the frequency is somewhat less. Nevertheless, the amplitude is damped rapidly.

Figure 9A:
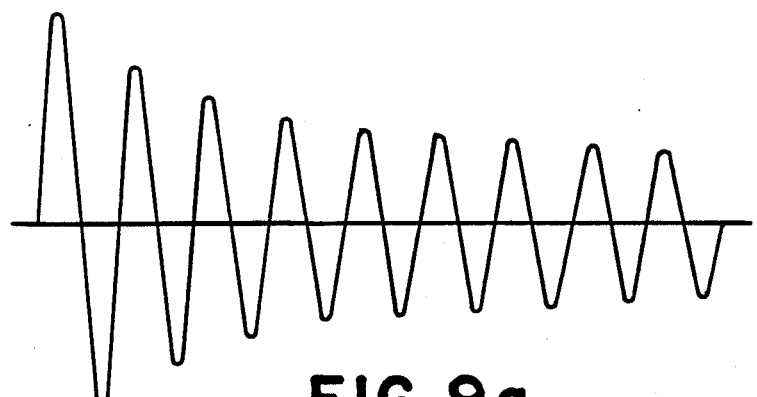
Figure 9B:
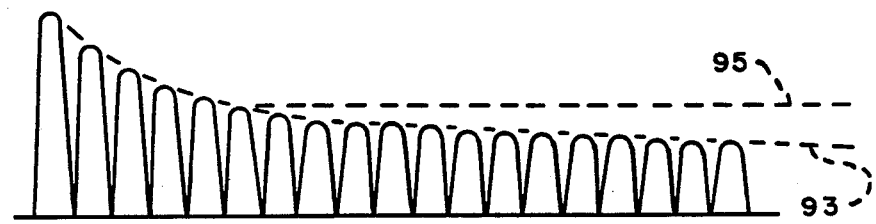

FIGS. 9a-9b once more shows a graph of a signal received when a pencil or other object is slightly pushing upwardly or downwardly against the tray 28. Referring specifically to FIG. 9b, the plot has its negative portion inverted and the slope 93 of the amplitude peaks is shown as well as the slope 95 of a valid weighing, the latter being essentially a straight line. If the slope 93 is too great, a determination can be made that the signal output by the transducer 41 is not a valid one. It will be noted that the amplitude of the plot drops significantly at the outset then decreases at a slower rate, but at a rate which is still greater than the decay of a valid signal. More specifically, the decay of the invalid signal is exponential.

Figure 10:
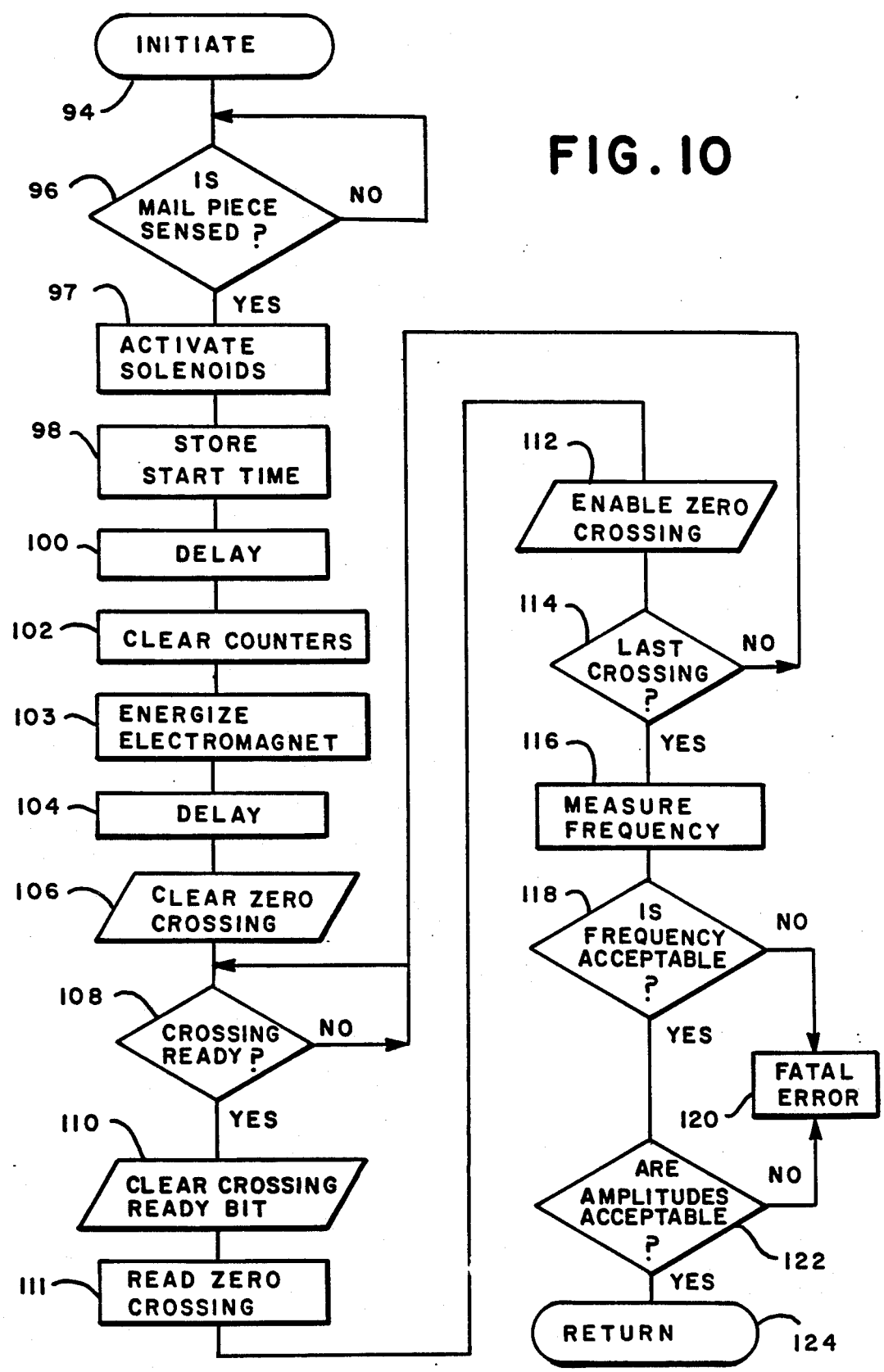

Referring now to FIG. 10 the steps in obtaining the mass of a mail piece 65 will be described. The system is initiated 94 by closing the switch 70. A mail piece 65 is placed on the tray 28 and sensed 96. The solenoids 22 are activated 97 so that the tray is free to oscillate. The start time is stored 98 and a delay is provided 100 to clear the counters 102. The electromagnet 32 is energized 103 and another delay is provided 104 to make sure the poles 38,40 of the electromagnet have been activated. The zero crossing ready bit is cleared 106 and an inquiry is made whether the zero crossing detector 76 is ready 108. If so, the zero crossing ready bit is cleared 110 and reads the zero crossing count 111. The zero crossing check is enabled 112 and then a determination is made if the last or fixed number of zero crossings has taken place 114.

Upon the last zero crossing being ascertained, the frequency of the signals are compared to a normal signal. An inquiry is made whether the zero crossing frequency is within limits and orderly 118. If not, a fatal error is generated 120. If the frequency figure is acceptable, an inquiry is made if the amplitudes are within limits ard orderly 122. If not, again, a fatal error is generated 120, but if the amplitudes are determined to be within limits and orderly the data generated is sent to the controller 66 through a return 124.

Although the instant invention has been described as it can be practiced with a horizontal vibration tray type scale, it will be appreciated that the invention has application to other types of scales where a tray is oscillated and weight determined during oscillation.

What is claimed is:

1. A weighing scale comprising:
   a horizontally extending article supporting means,
   means for securely holding an article on said article supporting means to allow unity of movement,
   means for oscillating said article supporting means,
   means for a generating a sinusoidal wave signal in response to the oscillation of said article supporting means,
   means for monitoring said sinusoidal wave signal to determine the regularity of the frequency of oscillation, and
   means for determining the mass of an article on said article supporting means in response to said sinusoidal signal upon said monitoring determining a regular oscillation.

2. The scale of claim 1 wherein said means for causing oscillation includes an electromagnet secured to a frame and an armature secured to said article supporting means, said armature being in close proximity to said electromagnet.

3. The scale of claim 1 including means for sensing the presence of an article on said article supporting means.

4. The scale of claim 1 wherein the regularity of the frequency of the oscillation is measured.

5. The scale of claim 1 including means for measuring the regularity of the amplitude of said sinusoidal curve.

6. A mass measuring device comprising:
   a base
   a horizontally extending article receiving tray,
   at least one flexible member providing connection between said base and said article receiving tray,
   a transducer connected to said at least one flexible member,
   means for initiating free oscillation of said article receiving tray,
   means for measuring the output of said transducer,
   means for determining if the output of said transducer is authentic, and
   means for determining the mass of an article located upon said platform in response to said measuring means upon a determination said output is authentic.

7. The mass measurement device of claim 6 wherein said means for oscillating said platform includes means for oscillating said tray in the plane of said tray.

8. The mass measuring device of claim 7 including means for sensing the presence of an article on the said platform.

9. The mass measuring device of claim 6 wherein said means for determining the authenticity of said output includes means for monitoring the frequency of said output and determining the output is not authentic if the frequency is found to be irregular.

10. The mass measuring device of claim 6 wherein said means for determining the authenticity of said output includes means for monitoring the regularity of the amplitude of said output and determining the output is not authentic upon a finding the amplitude decays at a rate above a given rate.

11. A method of determining the authenticity of the mass of an article weighed by a vibrating tray scale, the steps comprising:
supporting a tray with at least one flexible member,
placing a transducer on said at least one flexible member,
oscillating the tray,
measuring the output of the transducer against a standard output, and
determining the authenticity of the output mass of the article based upon said comparison.

12. The method of claim 11 wherein the determining step includes monitoring the frequency of the transducer output.

13. The method of claim 12 wherein the determining step includes monitoring the amplitude of the transducer output.

14. The method of claim 11 wherein the authenticity determining step includes monitoring the uniformity of the frequency of the transducer output.

15. A method of determining the mass of an article. the steps comprising:
placing an article upon a platform,
initiating free oscillation of the platform,
determining the frequency of the oscillation of the platform,
determining the authenticity of the frequency of oscillation, and
determining the mass of the article in response to the frequency measurement.

16. The method of claim 15 wherein the authenticity determining step includes monitoring the uniformity of the frequency of the transducer output and determining the output of the transducer is not authentic if the frequency is found to be non-uniform.

17. The method of claim 15 wherein the authenticity determining step includes monitoring the amplitude of the transducer output and determining the output is not authentic upon a finding the rate of amplitude decay is above a given rate.

18. A method of determining the mass of an article, the steps comprising:
placing an article upon a platform,
initiating free oscillation of the platform,
generating a signal corresponding to the oscillation of the platform,
determining the authenticity of the generated signal, and
determining the mass of the article based upon the authenticity of the signal being determined.

* * * * *